Dec. 24, 1968   N. VAN SLAGEREN   3,417,937

DEVICE FOR ADJUSTABLY DRIVING TWO PARALLEL REEL SPINDLES

Filed Dec. 20, 1966

INVENTOR.
NANNO VAN SLAGEREN

BY

*AGENT*

United States Patent Office 3,417,937
Patented Dec. 24, 1968

3,417,937
DEVICE FOR ADJUSTABLY DRIVING TWO PARALLEL REEL SPINDLES
Nanno van Slageren, Emmasingel, Eindhoven, Netherlands, assignor to North American Philips Co., Inc., New York, N.Y., a corporation of Delaware
Filed Dec. 20, 1966, Ser. No. 603,380
Claims priority, application Netherlands, Jan. 6, 1966, 6600123
3 Claims. (Cl. 242—55.12)

ABSTRACT OF THE DISCLOSURE

A driving mechanism for the reels of a tape recorder/reproducer is described. As shown, the spindles of the two tape reels are each provided with an electrically conductive disc. The discs are arranged in a common plane and spaced apart. Interposed between confronting peripheries of the discs is a permanent magnet with multiple poles and rotatable on a driven shaft with axis parallel to the axes of the discs. By translatory movement of the axis of the magnet so that its periphery is coupled to the periphery of one or the other disc to a greater or lesser extent, the degree of coupling is varied between the driven shaft and each reel spindle and the corresponding rotation force for the reel is accordingly varied.

---

The invention relates to a device for adjustably driving two parallel reel spindles of a device for recording and/or reproducing recordings on a tape-shaped record carrier, wherein a driving shaft for the transmission of a torque is connected by means of an eddy-current coupling with the reel spindles. The eddy-current coupling consists of a first part having the form of a multipole magnet ring and of a second part of electrically conductive material co-operating with the first part. One of these parts is journalled on the driving shaft and the other part is journalled on the reel spindle to be driven. The two parts are adjustable with respect to one another in order to permit of varying the transmitted torque. The arrangement is such that a decrease of the torque transmitted on one reel spindle results in an increase of the torque transmitted to the other reel spindle.

In a known device of the said kind, each of the two reel spindles is driven by an individual motor. The two motors are suspended at the ends of a yoke centrally supported so as to be rotatable and each drive a multipole magnet ring. There is placed on each of these magnet rings a bell-shaped body which is journalled on one of the reel spindles. The bell-shaped bodies are provided with a ring of electrically conductive material which may be introduced entirely or in part into the magnetic field of the magnet ring by pivoting the yoke so that the magnet rings are displaced in an axial direction with respect to the reel spindles. Due to the use of the yoke and the two motors with complete eddy-current couplings, this known device is comparatively complicated and hence expensive. The object of the invention is to provide a simpler device and is characterized in that the part of the eddy-current coupling co-operating with the magnet ring has the form of a disc which is placed partly in the magnetic field of the magnet ring, the disc and the magnet ring being adjustable with respect to one another by a relative movement in a direction parallel to the plane of the disc, for which purpose the driving shaft is journalled on a support arranged between the two reel spindles which is adapted to move to and fro in a plane at right angles to these spindles.

This step ensures that only one driving shaft is required which is common to the two reel spindles. As a result, only one motor is required.

A preferred embodiment of the device in accordance with the invention is characterized in that the multipole magnet ring is journalled on the driving shaft while the magnetic circuit of this ring is closed by discs of ferromagnetic material arranged above and below this ring and likewise journalled on the driving shaft, one of these discs constituting with the magnet ring an air gap which receives the disc-shaped parts of electrically conductive material provided on the reel spindles by part of their circumference.

This embodiment has the advantage that only one multipole magnet ring is used which is common to two simple discs of electrically conductive material each journalled on a reel spindle.

A further embodiment of the device in accordance with the invention is characterized in that the support for the driving shaft consists of a lever which is adapted to pivot between two extreme positions and to rotate about a shaft which is arranged between the reel spindles and which is in line with the motor shaft, which motor shaft is provided with a pulley which drives the part of the eddy-current coupling journalled on the driving shaft by means of a cord.

This embodiment not only has a simple construction, but it moreover has the advantage that the masses to be displaced for varying the torque to be transmitted are small.

The invention will now be described more fully with reference to the drawing, which shows an embodiment of a device in accordance with the invention.

Figure 1:
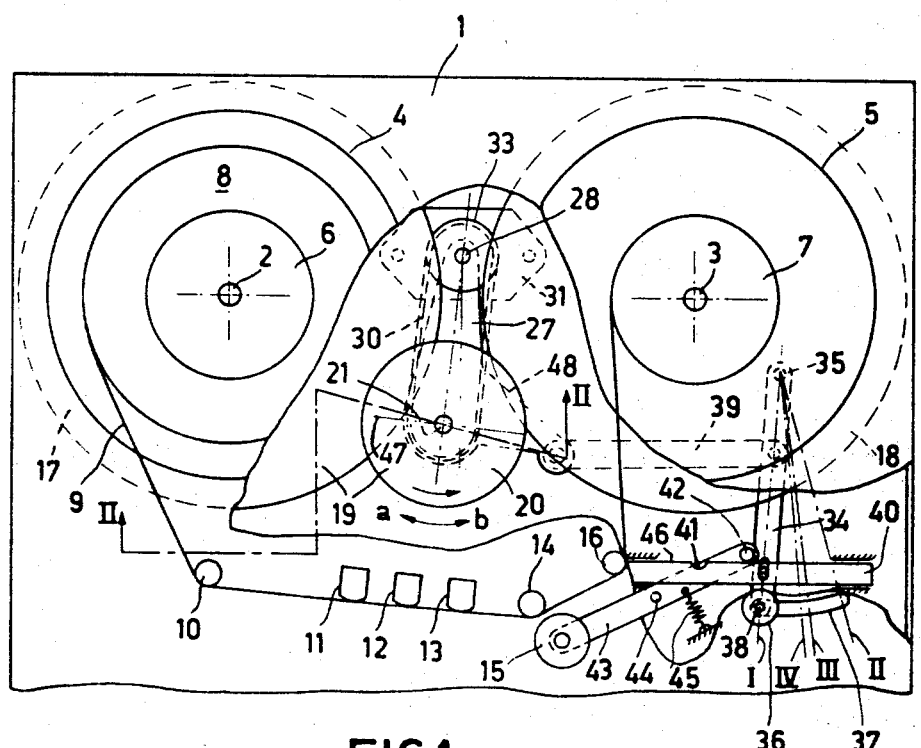
FIG. 1 is a diagrammatic plan view of part of a magnetic tape apparatus the mounting plate of which has partly be omitted.
Figure 2:
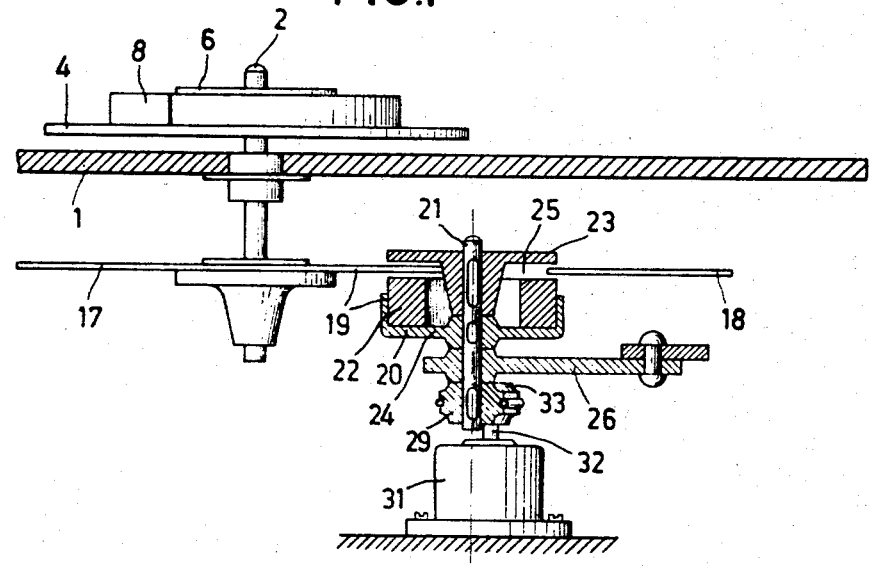
FIG. 2 is a sectional view of this apparatus taken on the line II—II of FIG. 1.

The apparatus shown in the figures has a mounting plate 1 on which two reel spindles 2 and 3 are journalled. The spindles 2 and 3 are provided with turntables 4 and 5 with winding cores 6 and 7. A roll 8 of a record carrier 9 having the form of a magnetic tape is provided on the core 6. The tape 9 extends from the supply roll 8 via a guide 10 and magnetic heads 11, 12 and 13 along a driving shaft 14 against which the tape can be pressed with the aid of a pressure roller 15.

The tape further extends from the driving shaft 14 along a second guiding roller 16 to the winding core 7 which serves as take-up core.

The two reel spindles 2 and 3 are driven by discs 17 and 18 of electrically conductive material provided on these spindles. These discs each constitute the driven part of an eddy-current coupling 19 the driving part 20 of which is journalled on a driving shaft 21. The driving part 20 includes a multipole magnet ring 22 the magnetic circuit of which is closed by discs 23 and 24 of ferromagnetic material arranged below and above this ring on the shaft 21. The disc 23 and the magnet ring 22 together constitute an air gap 25 which receives the discs 17 and 18 journalled on the reel spindles by part of their circumference.

The shaft 21 is rotatably journalled on a support 26 which is arranged between the two reel spindles 2 and 3 and which is adapted to move to and fro in a plane at right angles to these spindles in the direction of the arrows *a* and *b*. For this purpose, the support 26 is constructed as a lever 27 which is adapted to pivot about a shaft 28 with the aid of a suitable operating mechanism which will be described more fully hereinafter.

The shaft 21 has provided on it a pulley 29 which is driven by means of a cord 30 and a motor 31. The motor 31 has a shaft 32 provided with a pulley 33 on which runs the cord 30. The shaft 28, about which the lever 27 is adapted to pivot, and the motor shaft 32 are in line with one another.

The operating mechanism for pivoting the lever 27 includes an operating lever 34 which is adapted to pivot about a shaft 35. The lever 34 is provided with an operating button 36 which is secured to a pin 38 taken through a slot 37 in the mounting plate 1. The pin 38 is in turn secured to the lever 34. The lever 34 is coupled with the lever 27 by means of a connecting rod 39 which is pivotally connected to the levers 27 and 34. The operating lever 34 is pivotally connected to a slide 40 which is procan be held by a suitable stop device (not shown in the figures).

The operating lever 34 may be used at the same time for operating the pressure roller 15. For this purpose, the lever 34 is pivotally conected to a slide 40 which is provided with a recess 41. A pin 42 co-operates with this recess and is secured to an arm 43 on which the pressure roller 15 is also journalled. The arm 43 is adapted to rotate about a shaft 4. A spring 45 engaging the arm 43 ensures that the pin 42 remains in contact with a guiding surface 46 of the slide 40. The recess 41 forms part of the guiding surface 46.

The device above described operates as follows.

If the operating lever 34 is set to its position I shown in the figures, the lever 27 is displaced in the direction of the arrow a. As a result, the magnet ring 22 performs a relative movement with respect to the discs 17 and 18 in a direction parallel to the plane of these discs and the region 47 by which the disc 17 is received by the air gap 25 of the driving part 20 of the eddy-current coupling is enlarged and the corresponding region 48 of the disc 18 is reduced. This implies that a larger torque can be transmitted to the disc 17 than to the disc 18 so that the tape 9 is rewound on the winding core 6, while the torque transmitted to the disc 18 counteracts and the tape 9 is kept stretched tautly.

If the operating lever 34 is set to its position II, the inverse takes place and the region 48 is larger than the region 47 so that the tape 9 is wound on the winding core 7. A counteracting torque is transmitted to the disc 17 so that the tape 9 is kept tautly stretched.

If the lever 27 is moved between the positions I and II, a continuous transition from a maximum to a minimum torque to be transmitted to the discs (and conversely) can be achieved.

The operating mechanism is constructed so that, if the lever 34 is set to one of its positions I or II, the pressure roller 15 is lifted from the driving shaft 14. This is effected by means of the pin 42 which is pressed against the guiding surface 46 under the action of the spring 45. If the lever 34 is set to an intermediate position III, the pin 42 is disposed in the recess 41 and the pressure roller 15 engages the driving shaft 14. The tape 9 is then transported by this driving shaft at a speed suitable for making or playing back recordings. In the intermediate position III, the lever 34 is located in a region between the position II and an intermediate position IV which lies midway between the positions I and II. In the position III, the region 48 is consequently larger than the region 47.

If the lever 34 is set to its intermediate position IV, the regions 47 and 48 are equal and the torques transmitted to the discs 17 and 18 compensate one another. Moreover, in this position IV, the pin bears on the surface 46 so that the pressure roller is lifted from the driving shaft 14. The tape 9 is therefore not transported if the lever 34 is in this position IV.

Modifications of the embodiment described above may be made. For example, the displacement of the lever 27 and hence of the magnet ring 22 can be effected not only by the lever system 34, 39 to be manually operated, but also independently of the system 34, 39 by means responding to the stress of the tape which on the one hand are influenced by the stress and hence by the position of the tape and which one the other hand are coupled with the lever 27 so that the stress of the tape can be adjusted.

What is claimed is:

1. Apparatus for adjustably driving two reel members, comprising spindle members for supporting said reel members, said spindle members being arranged in spaced relationship with their axes parallel, a disc member secured on each of said spindle members, said disc members being positioned in a common plane with their peripheries in spaced confronting relationship, eddy-current generating means for selectively driving said spindles, said eddy-current means comprising a magnet system comprising a multiple pole magnet mounted on a rotatable shaft, means for mounting said shaft with its axis parallel to the axes of said spindle members and for positioning said magnet in coupling relationship with said discs, means for selectively varying the degree of coupling between said magnet and said discs comprising means for moving said magnet supporting shaft in translation parallel to the plane of said discs, and means for applying a rotation force to said magnet supporting shaft.

2. A device as claimed in claim 1 wherein said magnet system comprises two end members of ferromagnetic material enclosing the said magnet and having peripheral edges in spaced abutting relationship thereby to define an air gap therebetween, and wherein said discs engage the said air gap to a greater or lesser degree as determined by the position of said magnet shaft moving means.

3. A device as claimed in claim 1 wherein said magnet shaft moving means comprises a lever member rotatable about a pivot axis between two extreme positions, and further comprising motor means for rotating said spindles, and comprising shaft means having an axis coincident with said pivot axis, pulley means arranged on said motor shaft means, and belt coupling means interconnecting said pulley and magnet rotating shaft.

References Cited

UNITED STATES PATENTS

| 1,840,726 | 1/1932 | Lange | 310—105 |
| 2,808,551 | 10/1957 | Morrison | 310—101 X |
| 2,855,160 | 10/1958 | Fundingsland | 242—55.14 |

GEORGE F. MAUTZ, *Primary Examiner.*

UNITED STATES PATENT OFFICE
CERTIFICATE OF CORRECTION

Patent No. 3,417,937                                December 24, 19(

Nanno van Slageren

It is certified that error appears in the above identified patent and that said Letters Patent are hereby corrected as shown below:

Column 2, line 33, "be" should read -- been --. Column 3, line 11, "is pivotally connected to a slide 40 which is pro-" should read -- has two extreme positions I and II in which it - line 16, "conected" should read -- connected --; line 20, "4" should read -- 44 --.

Signed and sealed this 10th day of March 1970.

(SEAL)
Attest:

Edward M. Fletcher, Jr.                     WILLIAM E. SCHUYLER, JR.
Attesting Officer                                    Commissioner of Patents